(12) United States Patent
Wiesauer

(10) Patent No.: US 6,688,177 B2
(45) Date of Patent: Feb. 10, 2004

(54) METHOD FOR EXAMINING OBJECTS USING ULTRASOUND

(75) Inventor: Franz Wiesauer, Zipf (AT)

(73) Assignee: GE Medical Systems Kretztechnik GmbH & Co. OHG, Zipf (AU)

( * ) Notice: Subject to any disclaimer, the term of this patent is extended or adjusted under 35 U.S.C. 154(b) by 32 days.

(21) Appl. No.: 09/874,096

(22) Filed: Jun. 5, 2001

(65) Prior Publication Data

US 2002/0007680 A1 Jan. 24, 2002

(30) Foreign Application Priority Data

Jun. 6, 2000 (EP) .............................. 00890183

(51) Int. Cl.[7] .............................. G01N 29/00; A61B 8/00
(52) U.S. Cl. .............................. 73/618; 73/620; 600/447
(58) Field of Search .............................. 73/618, 620, 622, 73/623, 624, 625, 627, 628, 629, 632, 633; 600/443, 447, 458, 600

(56) References Cited

U.S. PATENT DOCUMENTS

| 4,993,417 A | * | 2/1991 | Seo | .............................. | 128/661.09 |
| 5,544,659 A | | 8/1996 | Banjanin | | |
| 5,873,830 A | | 2/1999 | Hossack et al. | | |
| 5,919,138 A | * | 7/1999 | Ustuner | .............................. | 600/443 |
| 6,193,660 B1 | * | 2/2001 | Jackson et al. | .............................. | 600/443 |
| 6,368,279 B1 | * | 4/2002 | Liu | .............................. | 66/443 |

FOREIGN PATENT DOCUMENTS

| AT | 358 155 | 8/1980 |
| EP | 0 962 785 | 12/1999 |

* cited by examiner

Primary Examiner—Helen Kwok
(74) Attorney, Agent, or Firm—Collard & Roe, P.C.

(57) ABSTRACT

In a method for examining objects using ultrasound according to the reflection process, in particular 3D scanning, the object is scanned with an ultrasound transducer (1) with associated transmit/receive unit (2, 4) appropriate for volume scanning and the obtained echo data are stored in a volume memory (5) in clear assignation to the local coordinates of the reflection points. During scanning the spatial line density and/or the temporal repetition frequency, in which certain volume areas are scanned, is deflected by the contents of the information obtained or obtainable from these areas in such a form that areas having less information content are scanned more seldom and/or with less scanning density than areas having a higher information content.

6 Claims, 3 Drawing Sheets

METHOD FOR EXAMINING OBJECTS USING ULTRASOUND

FIELD OF THE INVENTION

The present invention relates to a method for examining objects using ultrasound according to reflection processes, in particular 3D scanning, wherein the respective object is scanned with an ultrasound transducer with associated transmit/receive unit appropriate for volume scanning and the obtained echoes are stored in a volume memory with reference to the spatial coordinates of the reflection points, from which memory they are accessed according to selectable accessing criteria and can be forwarded to an evaluation unit, in particular a display unit.

DESCRIPTION OF THE PRIOR ART

Such methods have been known for quite some time and are documented in AT 385 155 B, for example, which relates to expanding the ultrasound cross-sectional image recording (B-image), wherein a sound beam is swiveled in a plane, thus recording a cross-sectional image. To obtain the information along an idealized beam a focused sound wave is emitted which is partially reflected by the object structures as it penetrates into the object being examined, generating echoes which are evaluated according to the flight time— this determines the distance of the echo to the transducer— and according to the amplitude which determines the brightness of the B-image mode. With the well-known Doppler method changes in frequency are recorded and thus the direction of flow or flow rate in blood vessels is determined. The total of all assessed information as well as position information of the swiveling transducer create the ultrasound image. The repetition rate by which a specific part of the object is rescanned results from the maximum desired penetration depth and the number of scan lines per image. At a required penetration depth of 20 cm a period of approximately 260 microseconds elapses, until echoes are received from the maximum penetration depth on the transducer. If an ultrasound image comprises 200 scanning beams, then a specific area can be scanned about 20 times per second. For 3D-scanning, the cross-sectional plane is swiveled in perpendicular direction over the volume of interest, such that if for instance 200 images corresponding substantially to the B-image in different positions are to be obtained from the volume each part of the volume is rescanned only once in 10 seconds with the above mentioned assumptions, leading to prolonged scanning times for recording of a volume and in the case of moving objects, the movement in a given volume area can be viewed only disjointedly.

For increasing the scanning density it is known to generate multiple scan lines from each emitted ultrasound wave when the echoes are being received, whereby usually four scan lines are processed In parallel, though for cardiological applications more than four lines can be processed. These techniques can be transferred to three-dimensional scanning, but not with total success, as evident from the above mentioned example.

For scans which combine different modalities, such as a B-image of the tissue and color Doppler imaging of blood flow, the scanning sequence, rigid in terms of time and location with B-images, is modified. A sequence of adjacent beams for B-mode scanning is interrupted by a sequence of ultrasound beams in a different position for Doppler evaluation. Also this method makes no consideration of movement of the object and follows a temporal and local sequence.

SUMMARY OF THE INVENTION

The aim of the present invention accordingly is to create a novel method which results in improved utilization of time used or to be used in ultrasound scanning, in particular with 3D scanning, without important information being lost.

This object is obtained according to the invention with a reflection method for the ultrasound examination of an object, which comprises the steps of 3D scanning the volume of the object with an ultrasound transducer associated with a transmit/receive unit and suitable for 3D volume scanning to obtain information constituted by echo signals, storing the obtained echo signals information in a 3D volume memory in clear assignation to the local coordinates of the echo signals, accessing the local coordinates from the 3D volume memory according to selectable accessing criteria, and forwarding the local coordinates to an evaluation unit. The spatial line density and/or the temporal repetition frequency, in which certain areas of the volume are scanned to obtain the information, is derived from this information in such a form that the areas having a lower information density are scanned more seldom and/or with less scanning density than the areas of higher information density, for which purpose a computer generates informations about the information density received from the same areas of the volume at different times, and controls a control unit for adjusting the repetition frequency and/or the local scanning density, the control unit determining the location and timing of individual scanning instances.

The fundamental idea of the invention is to detect those areas within a volume to be examined, which have the least temporal and/or local changes and/or also the least information density and to restrict the number of scan-lines and scan-planes and their density to the required values. For example, in the case of pregnancy examinations the amniotic fluid area can be scanned with less line density and less frequently, whereby on the other hand areas with higher density of detail, such as soft tissue and areas with rapid image content change such as movement and organs, are scanned more often and more densely. The basic rule here will be the image change which actually occurs between two or more scans.

DESCRIPTION OF THE PREFERRED EMBODIMENTS

Figure 1:
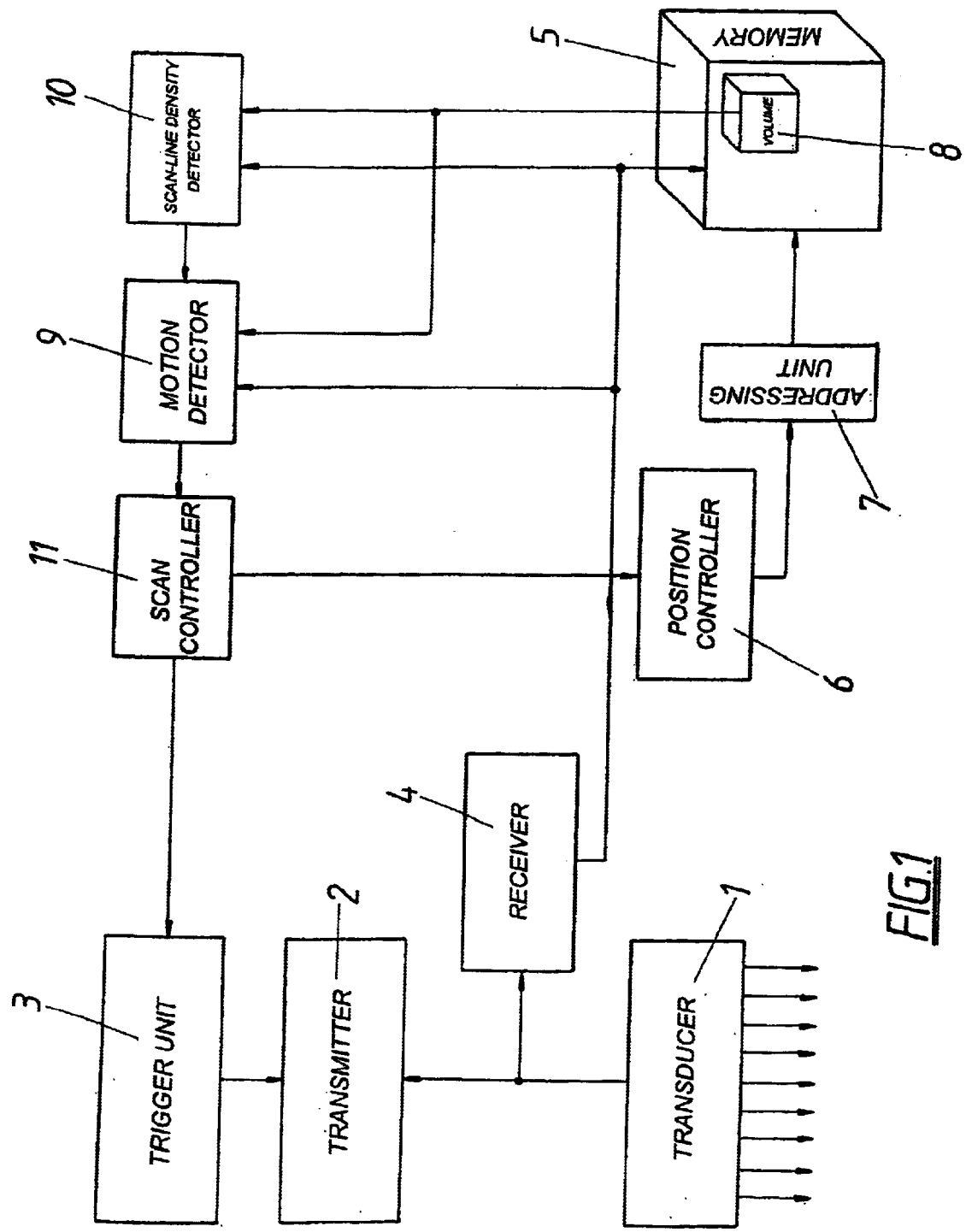
FIG. 1 is a schematic diagram of the overall arrangement used for the method according to the present invention, omitting a view of the image processing unit as well as the display unit, since in the case of the method according to the present invention it depends essentially on controlling the scanning times and the scanning density and the units required therefor.

FIG. 1 shows an ultrasound transducer 1 appropriate for 3D ultrasound scanning, which is activated by an ultrasound transmitter 2 according to control by a trigger unit 3, whereby the received echoes are converted into electrical signals and fed to an ultrasound receiver 4. The arrangement is known in this respect. The amplitude can be processed according to B image method and the frequency or phase change (Doppler processing) of the echo signals can also be processed, whereby in the latter case evaluations can be made in the vicinity of the nominal frequency and also of the harmonic frequencies. Techniques such as parallel processing of several receiving channels in ultrasound sending and processing are feasible also. The received signals are saved in a three-dimensional memory 5, whereby saving the information is controlled by a position controller 6 which gives information on the momentary sending location of the sound beams and to an addressing unit 7. Within the total storage volume a volume 8 is represented as volume of interest, which means that this storage volume is of particular interest for momentary examination. In the embodiment the signals originating from the most recent scan are stored in this storage area 8 according to address. Assigned to the memory is a motion detector 9 and a detector 10 is provided for scan-line density. The data contained in storage volume 8 are read before input of the latest data string and compared in 9, 10 to the newly arriving data. This comparison can affect different parameters. On the one hand a comparison is preferably made as to how closely the new data match the previously stored data and movement therefrom is detected in 9, and on the other hand a comparison is made in 10 also of how fine the texture of the new ultrasound image is. From these data computer and control unit 11, which could also be described as the scan controller, calculates the new scan strategy.

Figure 2:
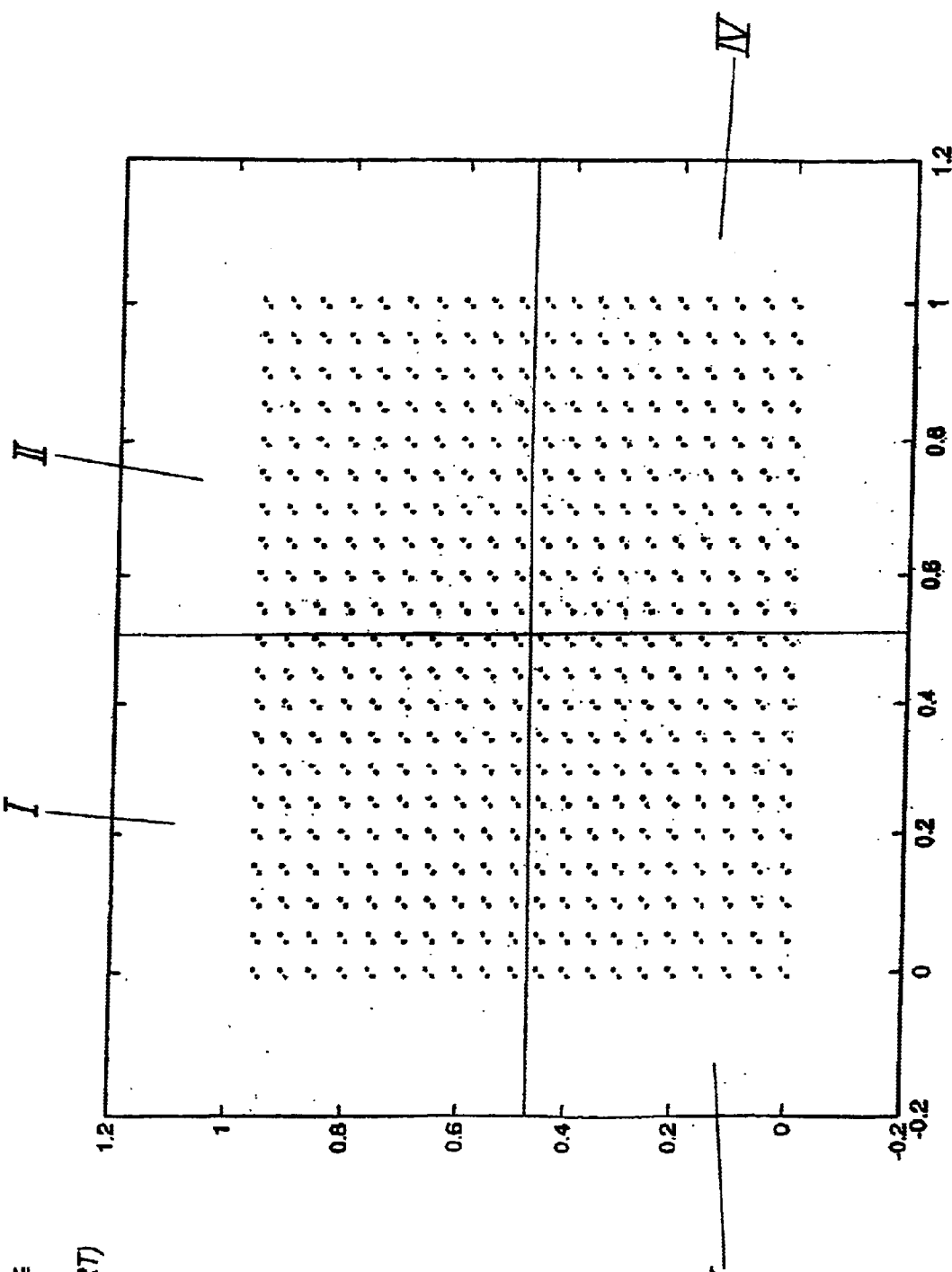
FIG. 2 is a schematic representation of the scanning density in a volume according to the previously known methods.
Figure 3:
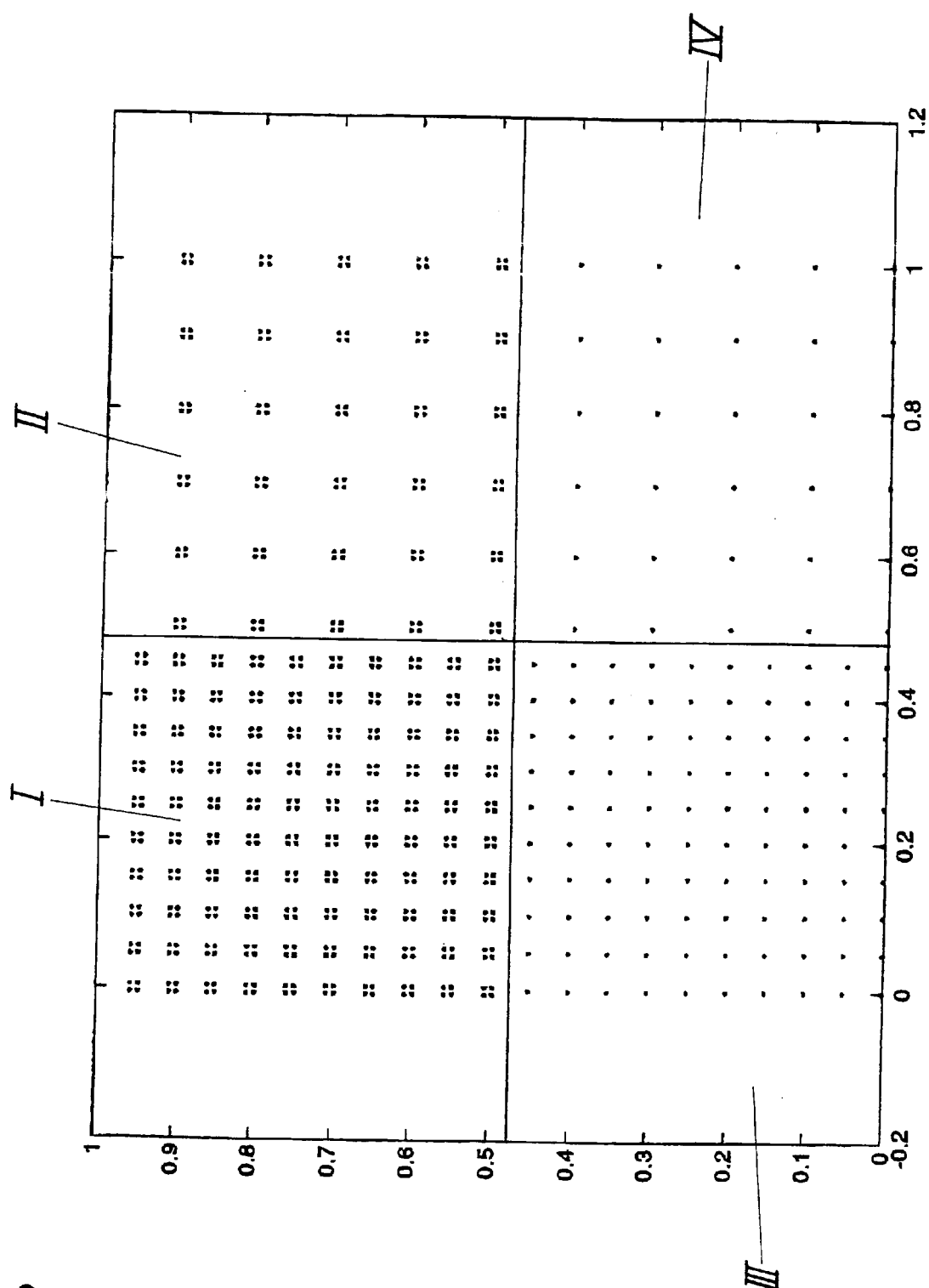
FIG. 3 shows the possible distribution of the scanning density according to the method of the present invention in the same illustrative manner as FIG. 2.

Four identical fields are illustrated in FIGS. 2 and 3 for better understanding, whereby Field I shows an area where a moving organ, which requires a high resolution for proper viewing, is present in the volume. A moving organ requiring a lower resolution is acquired in Field II, while Field III shows a non-moving organ requiring a lower resolution than a moving organ, yet a higher resolution than a non-moving organ (such as amniotic fluid) as found in scanning area 4.

According to the prior art as in FIG. 2 it is seen that the marks of the ultrasound scan lines shown as dots are distributed over the entire volume. Dots at each individual location indicate the frequency of scanning, that is, the repetition frequency. The repetition frequency is constant for each individual dot in the execution as per the prior art. By comparison, with the method according to the present invention as per FIG. 3 area I is processed with the highest scan frequency and the highest scan density, area II is processed with the highest scan frequency, though substantially less scan density, area III is processed with high scan density, though lower scan frequency and area IV is processed with less scan density and less scan frequency. Fields I–IV are to be understood as clarification only, since those areas requiring different scan densities and different scan frequencies within a volume are distributed according the respective structures.

What is claimed is:

1. A reflection method for the ultrasound examination of an object, which comprises the steps of 3D scanning the volume of the object with an ultrasound transducer associated with a transmit/receive unit and suitable for 3D volume scanning to obtain information constituted by echo signals, storing the obtained echo signals information in a 3D volume memory in clear assignation to the local coordinates of the echo signals, accessing the local coordinates from the 3D volume memory according to selectable accessing criteria, and transmitting the local coordinates to an evaluation unit, the spatial line density and/or the temporal repetition frequency, in which certain areas of the volume are scanned to obtain the information, being derived from said information in such a form that the areas having a lower information density are scanned more seldom and/or with less scanning density than the areas of higher information density, for which purpose a computer generates informations about the momentary information density received from the same areas of the volume at different times, and the computer controls a control unit for adjusting the repetition frequency and/or the scanning density for the same areas, the control unit determining the location and timing of individual scanning instances.

2. The method of claim 1, wherein the temporal repetition frequency of the scanning is adjusted for each one of the areas of the volume in dependence of the movement of the echo signals in each area of the volume.

3. The method of claim 2, wherein the movement of the echo signals is calculated by correlating a data record recorded for each area of the volume with a later data record recorded for the same area of the volume.

4. The method of claim 3, wherein the data record are filtered before the movement of the echo signals is calculated.

5. The method of claim 1, wherein the scanning density for the same areas is adjusted for each one of the areas of the volume in dependence of the fineness of the echo signals in each area of the volume.

6. The method of claim 5, wherein the fineness of the echo signals is determined by frequency analysis.

* * * * *